United States Patent [19]

Martin et al.

[11] 4,103,842
[45] Aug. 1, 1978

[54] LOCKING SENSOR FOR BELT RETRACTOR

[75] Inventors: Thomas F. Martin, Euclid; James A. Nagy; Harold R. Scibbe, both of Chardon, all of Ohio

[73] Assignee: Repa Feinstanzwerk GmbH, Industriegebiet, Germany

[21] Appl. No.: 593,276

[22] Filed: Jul. 7, 1975

[51] Int. Cl.² .............. A62B 35/02; B65H 75/48
[52] U.S. Cl. .............. 242/107.4 A; 188/139; 200/61.52; 200/61.58 B; 361/142
[58] Field of Search .............. 242/107.4 R, 107.4 A, 242/107.2; 180/82 C; 280/744-747; 340/52 E; 307/103 B; 188/135, 137-139; 200/61.45 M, 61.45 R, 61.48, 61.49, 61.52, 61.58 B; 310/DIG. 3; 317/124; 297/386-388

[56] References Cited

U.S. PATENT DOCUMENTS

| | | | |
|---|---|---|---|
| 2,708,966 | 5/1955 | Davis | 242/107.4 A X |
| 3,269,685 | 8/1966 | Wallace | 200/61.52 X |
| 3,601,729 | 8/1971 | Hierta | 200/61.52 X |
| 3,740,000 | 6/1973 | Takada | 242/107.4 A |
| 3,748,415 | 7/1973 | Suzuki | 200/61.52 X |
| 3,825,205 | 7/1974 | Takada | 242/107.4 A |
| 3,882,337 | 5/1975 | Pfeffer et al. | 310/DIG. 3 |
| 3,953,084 | 4/1976 | Pittet et al. | 200/61.49 X |

*Primary Examiner*—Harvey C. Hornsby
*Assistant Examiner*—John M. Jillions

[57] ABSTRACT

An emergency locking retractor system for storing a length of safety belt incorporates a sensor which includes a multi-directional pendulum device displaceable from its rest position by acceleration. Displacement of the pendulum is utilized to change the strength of an energy field imposed upon an electrical signal means. The output signal of the signal means responds to the change in the energy field imposed thereon and the changed signal is employed to activate solenoid switches which lock the retractor. The energy field source may be a magnet or a light source and the signal means then may include, respectively, a Hall device or a phototransistor. Movement of the pendulum from its rest position is utilized to move the magnet closer to or further from the Hall device, or to interpose a shield between the light source and the phototransistor, or to change the position of a reflector used to reflect light from the light source onto the phototransistor. The resultant change in output signal is employed to close a circuit which connects a power source to the locking medium.

24 Claims, 12 Drawing Figures

LOCKING SENSOR FOR BELT RETRACTOR

The present invention is concerned with emergency locking retractor means which serve to lock belts, such as safety belts, stored on retractor reels in place in response to acceleration/deceleration forces in excess of a predetermined critical value.

The invention is more particularly concerned with an emergency locking retractor particularly adapted for automotive passenger safety belt system.

Safety belts, particularly automotive passenger safety belts, are normally stored on a take-up reel (referred to as a retractor) which is spring loaded or otherwise arranged so as to retract the belt when not in use, while permitting the belt to be easily reeled out so that the required amount of belt may be pulled out as needed. A locking device is required, however, which will lock the belt retractor to prevent further paying out of the belt upon a collision or sudden stop or start in order that the belt may serve its safety function. Thus, sensor devices are known which are actuated by relatively large acceleration forces imposed on the vehicle. Such mechanisms commonly employ a pendulum which is displaced by imposed acceleration forces from its normal or rest position. When such devices are affixed directly to the belt retractor, the pendulum mechanism frequently limits undesirably the available position and orientation of the retractor in the vehicle. Further, the device may unnecessarily and inconveniently lock the belt retractor to prevent paying out thereof when the vehicle is parked on a sharp grade.

It is therefore an object of the present invention to provide an emergency locking retractor device which permits complete latitude in the positioning and orientation of the retractors within the vehicle, since the device may be employed as a central sensor remotely wired to the retractors themselves, which is insensitive to the grade at which the vehicle is parked, and which is reliable and is made of relatively simple construction. Other objects and advantages of the invention will become apparent from the following description.

In accordance with the invention there is provided an actuation device to actuate a belt retractor lock which device includes signal means to generate an output signal, which signal is responsive to the strength of an energy field imposed on the signal means. The signal means is preferably an electrical signal means. An energy field source is positioned relative to the signal means so as to impose its energy field thereon. Preferably, the energy field source comprises either a magnet, the magnetic field of which provides the energy field, or a light source, the light beam emanating from which provides the energy field. Preferably, there is no physical contact or connection between the energy field source and the signal means; the two being physically unconnected to each other, and the signal means being mechanically static.

An energy field control device is structurally associated with the energy field source and the signal means to change the strength of the energy field imposed on the signal means responsive to acceleration (or deceleration) forces of a critical magnitude which are imposed on the device. The resultant change in output signal is utilized to operate a lock control means to engage a retractor lock with the retractor to lock the same against further paying out of the belt stored thereon.

The energy field control device preferably comprises a pendulum device having a normal or rest position from which it is displaced by acceleration (or deceleration) forces sufficiently great to overcome the inertia of the pendulum. The inertia of the pendulum device, and consequently the force required to overcome it, is preselected by selecting the mass of the pendulum weight and suitably damping it against movement. The energy field control device, the energy field source and the signal means are preferably encapsulated in a protective container in which associated circuitry may also be included. The encapsulation seals the components against the atmosphere. The inertia is set sufficiently high so that the device is not sensitive to normal acceleration or deceleration forces caused by normal operation of the vehicle, or by parking the vehicle on a sharp grade. Preferably, in accordance with current Government safety standards, the device must not operate when subjected to acceleration (or deceleration) forces of 0.3 gravity (g) or less, and must operate when subjected to such forces of 0.7 g or greater.

The pendulum device is multi-directional, i.e., acceleration forces of sufficient strength imposed from any direction about 360° of arc around the device will displace the pendulum.

Displacement of the energy field control means, preferably a pendulum device, in accordance with the invention, may be utilized to change the distance between an energy field source (e.g., a magnet or a means for directing a light beam against a light emitting diode) and the signal means (e.g., means including a Hall device responsive to a magnetic field, or means including a phototransistor responsive to the intensity of light impinging thereon). This may be accomplished by mounting the energy field source (e.g., a magnet) on the pendulum device so that displacement of the pendulum moves the energy field source away from (or towards) signal means (e.g., means including a Hall device) mounted on a stationary member. (Hall devices are well known in the art and utilize the so-called Hall effect wherein an electric current carried in a strip conductor is skewed relative to the conductor when a magnetic field is imposed on the strip conductor. The skewing of the equi-potential lines, which ordinarily run at right angles across the strip, is utilized, in the known manner, to change an output signal from the Hall device in response to the strength and position of a magnetic field imposed thereon. As above stated, such Hall devices are well known in the art and therefore need not be further described herein.) The strength of the energy field imposed on the signal means is thereby changed.

Alternatively, a shield may be mechanically associated with the pendulum device so that displacement of the pendulum device interposes the shield between the energy field source (e.g., a light emitting diode) and the signal means so that the strength of the field imposed on the signal means is diminished in response to displacement of the pendulum means. Alternatively, reflector means may be mounted on, or mechanically connected to, the pendulum device to reflect the energy field (e.g., a light beam) onto a portion (e.g., a phototransistor) of the signal means. Displacement of the pendulum device displaces the reflector means so that the strength of the field reflected onto the signal means is reduced or eliminated by changing the relative position of said reflector means to one or both of said energy field source and said signal means.

In general, the preferred pendulum device or other energy field control device and any structurally associated parts may comprise a component transport means adapted to change the relative position of components by moving one or more of the energy field source, the signal means, the shield means and the reflector means relative to each other.

In general, electronic detection of displacement of the pendulum is provided for, the detection resulting in the change of an output signal from the signal means which output signal is interfaced with belt retractor locking mechanisms, such as solenoid locking mechanisms, of one or a plurality of retractors. The output signal may be interfaced with the belt retractor locking mechanism by utilizing circuit closing means which respond to the change in output signal by closing a circuit connecting a power source to the locking mechanism electrical control means, i.e., a solenoid coil. The circuit may be closed by providing a switch means in the circuit which switch is responsive to said output signal or to changes in said output signal. Generally, the change in output signal is a change from effectively no output signal to establishment of an output signal. Naturally, the change could also be the increase of a relatively low output signal or the decrease of a relatively high output signal.

The circuit closing means can be an amplifier means which amplifies the output signal to actuate the lock control means. In one embodiment, a differential amplifier circuit is employed and is connected in series with a light source, e.g., a light emitting diode, as a power conservation measure.

For vehicles such as automobiles, the energization of the energy field source is preferably provided through the ignition key switch of the vehicle so that the belt locking function is prevented when the ignition key is off.

As used in this specification and claims, the phase "acceleration" has its usual meaning of a change in velocity per unit time and is specifically intended to mean and include increases in velocity (acceleration) as well as decreases in velocity (deceleration). Thus, high "acceleration" forces are imposed on a moving vehicle when it strikes an object so that its velocity is drastically reduced in a very short time, i.e., it undergoes what is normally referred to as "deceleration." Acceleration forces are imposed when a vehicle or object is struck, for example, by a moving vehicle or when a vehicle skids or otherwise veers out of control (such as an aircraft in a down-draft) with a resultant time rate of change of velocity. It is emphasized that as used herein "acceleration" is a general term which includes what is usually referred to as "deceleration."

The invention may be understood better from a consideration of the following description of preferred embodiments thereof of which the attached drawings form a part and wherein:

Figures 1, 2A:
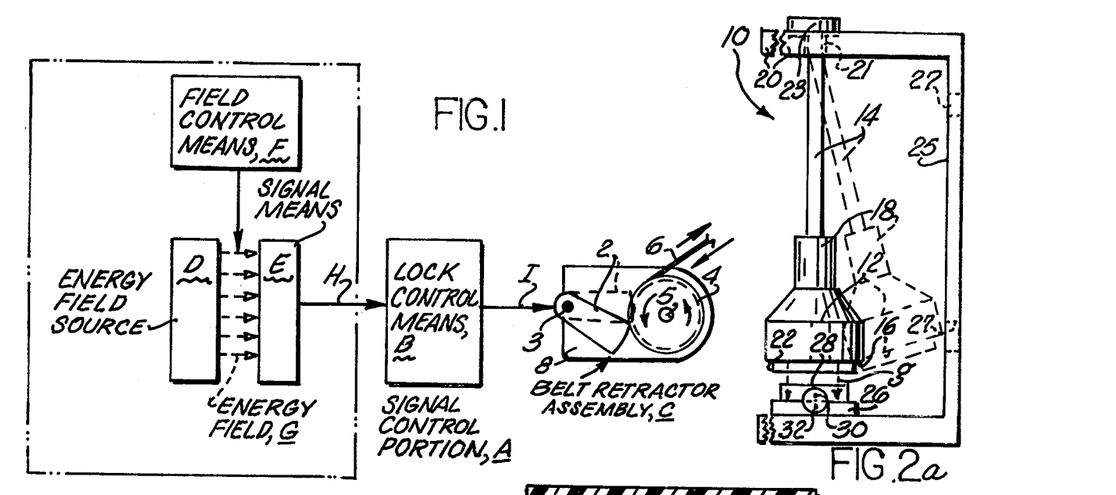
FIG. 1 is a schematic representation of an actuation device in accordance with the invention and an associated belt retractor assembly.
FIG. 2a is a partial side view in elevation taken along line a—a of FIG. 2.

Referring now to FIG. 1 an actuation device to actuate a belt retractor lock in accordance with the invention is schematically illustrated and includes a signal control portion A connected to a lock control means B by signal connector H. Lock control means B is in turn connected to belt retractor assembly C by control connector I so as to operate retractor lock 2 of assembly C. Belt retractor assembly C includes a belt pulley 4 around which is wound a belt 6. Belt pulley 4 and belt 6 are mounted on plate 8. While belt retractor assembly C may be of any suitable design, generally, belt reel or pulley 4 is free to rotate about its mounting shaft 5 in either direction (as indicated by the curved arrows on belt pulley 4) so as to permit belt 6 to be payed out or reeled in as indicated by the straight line arrows associated with belt 6 in FIG. 1. The retractor assembly C includes a locking mechanism for locking the reel or pulley 4 upon actuation thereof. The locking mechanism may take a variety of forms and for illustrative purposes only is shown as including a lock member 2. Retractor lock member 2 is rotatable about its journal pin 3 from a first position (shown in solid line in FIG. 1) in which it does not interfere with rotation of belt pulley 4, into a second position (shown in dotted line in FIG. 1) in which it can effect locking of the reel or pulley 4 even while an outward pull on belt 6 exists.

Lock control means B is connected to retractor lock 2 by connector I which serves to move retractor lock 2 between its first and second position in response to lock control means B operated from signal control portion A through signal connector H. Typically, connector I may be operated by the plunger of a solenoid.

Signal control portion A includes mechanically static signal means E which generates the output signal transmitted to lock control means B. An energy field source D is positioned relative to the signal means E so as to impose its energy field G thereon, as indicated by the dotted line arrows in FIG. 1. Field control means F is associated with energy field source D to change the strength of the energy field G imposed on signal means E in response to acceleration of the device.

In operation, with retractor lock 2 in its first, normal position (solid line in FIG. 1) belt pulley 4 is free to rotate about its journal shaft 5 so that belt 6 may be payed out or reeled in as required. In the case of a passenger safety belt, belt pulley 4 can be spring loaded so that the belt is held snugly about the passenger but the passenger is free to move somewhat and the belt will pay out responsive to body movements for comfort and to permit some mobility of the passenger. Upon field control means F sensing acceleration of the vehicle above a predetermined minimum value, usually 0.7 gravity, field control means F changes the strength of energy field G imposed on signal means E either by changing the relative position of energy field source D to signal means E, or by interposing a shield or displacing a reflector between energy field source D and signal means E.

For simplicity of construction and reliability of operation, field control means F preferably embodies a pendulum device which, upon acceleration, is moved from a normal rest position to a displaced position and thereby changes the strength of energy field G imposed on signal means E. The pendulum movement may be utilized to effect, between energy field source D and signal means E, relative movement, and/or interposition of a shield and/or displacement of a reflector. After the acceleration force ceases, the pendulum swings back into its rest or normal position, the signal means is reversed, i.e., the output signal returns to its former, normal state, and the solenoid coils are de-energized. A small internal spring (not shown) returns the solenoid plunger to its normal position, in which the retractor is unlocked.

Figure 2:
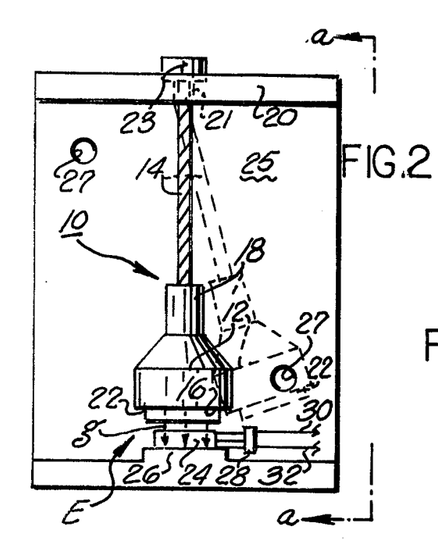
FIG. 2 is an elevation view of the signal control portion of a magnetic field embodiment of the invention.

Referring now to FIG. 2, there is shown one embodiment of the invention wherein a signal means E is mounted adjacent the rest position of a pendulum on a stationary member, and the energy field source is mounted on the pendulum. This embodiment includes a pendulum generally indicated at 10 comprising a pendulum weight 12 attached to a calibrated spring wire 14. Weight 12 has a base portion 16 which is generally flat and a collar 18 to which wire 14 is secured at its lower end. The upper end of wire 14 is secured to a pendulum mount 20 which conveniently forms part of or is attached to the vehicle or other equipment in which the device of the invention is employed. Wire 14 passes through a hole 21 in mount 20 and is secured by a cap 23.

Secured to base portion 16 of pendulum weight 12 is a magnet 22 which comprises the energy field source D of the embodiment of FIG. 2. Magnet 22 is preferably a permanent magnet although an electromagnet may be employed. A Hall device 24 is mounted to a support 26 which conveniently comprises a part of, or is attached to, the vehicle or other equipment in which the device of the invention is used. Hall device 24 comprises the signal means E of the embodiment of FIG. 2. An electrical connector 28 connects Hall device 24 to suitable electrical leads 30, 32 which are connected through lock control means (not shown in FIG. 2) to operate a retractor lock of a belt retractor assembly (not shown in FIG. 2) in any suitable manner. Leads 30, 32 correspond to signal connector H of FIG. 1.

While support 26 and pendulum mount 20 may be separately attached to the vehicle or other equipment, they may conveniently be provided in the form of flanges extending from a web 25 so that mount 20, web 25 and support 26 together comprise a convenient mounting bracket which may be affixed to the vehicle or equipment, e.g., by mounting holes 27 as illustrated. The distance which mount 20 and support 26 extend outwardly from web 25 is great enough to provide room for sufficient displacement of pendulum 10 in any direction about 360° from its point of suspension from mount 20 to actuate the signal device, as is illustrated in FIG. 2a.

In its normal or rest position pendulum 10 will be positioned relative to Hall device 24 as shown in solid line in FIGS. 2 and 2a. Upon acceleration of the device, pendulum 10 will be displaced in a direction dependent upon the direction of acceleration. It will be appreciated that the pendulum is multi-directional, by which is meant that depending on the direction of the force or force vector acting on it, it can be displaced in any direction in the 360° circle about its support point since wire 14 can bend in any direction. Thus, the device will respond to acceleration forces regardless of the direction from which imposed. Displacement from rest of pendulum 10 is indicated in dotted outline in FIG. 2 in one direction, and in dotted outline in FIG. 2a in another direction. The distance between magnet 22 and Hall device 24 is thereby increased upon acceleration, and the strength of the magnetic field g imposed on Hall device 24 is thereby diminished. Thus, the imposition of acceleration forces of sufficient strength results in a change in the output signal transmitted through leads 30, 32 to the lock control means B (not shown in FIG. 2). This change in signal operates, by suitable circuitry, a retractor lock, as described below.

The mass of pendulum weight together with the stiffness of spring wire 14, is selected so that acceleration forces below a selected critical value, i.e., acceleration and deceleration forces encountered upon normal starting and stopping of a vehicle, do not displace pendulum 10 at all or not sufficiently far to increase the distance between magnet 22 and Hall device 24 sufficiently to noticeably modify the output signal of Hall device 24.

Figure 3:
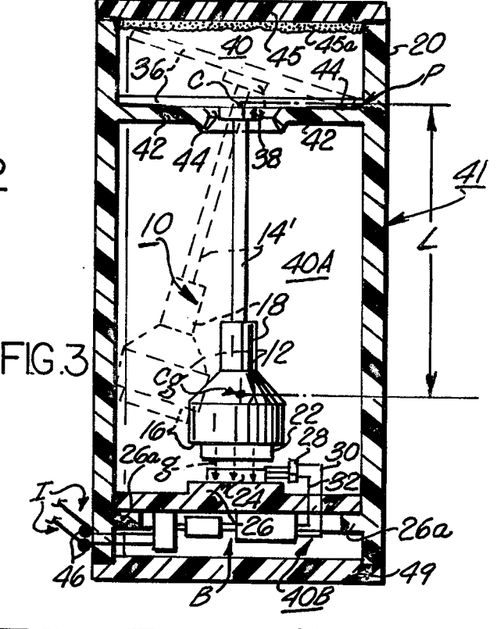
FIG. 3 is an elevation view of the signal control portion of the invention showing a second magnetic field embodiment, the view being in section.

FIG. 3 shows another embodiment of the invention wherein the signal control portion is encapsulated. Parts corresponding to those shown in the embodiment of FIG. 2 are correspondingly numbered. A pendulum generally shown at 10 includes a pendulum weight 12 having a flat base portion 16 to which a magnet 22 is affixed. A Hall device 24 is mounted to a support 26 (which is mounted within a tube 41 as described below) so that the Hall device is in close proximity to magnet 22 when pendulum 10 is at its normal or rest position. Electrical leads 30, 32 lead to lock control means B comprising circuit components shown secured to the underside of support 26. Instead of a calibrated wire spring as in the FIG. 2 embodiment, the pendulum 10 of the FIG. 3 embodiment employs a rigid connecting rod 14' connected to collar 18 of pendulum weight 12. Connecting rod 14' is affixed rigidly at its other end to a disc-shaped pivot plate 36 by means of a mounting collar 38. Pivot plate 36 comprises a disc having a circular peripheral rim portion 37. Pendulum support 20 in this case comprises a chamber 40 within which pivot plate 36 may pivot as indicated by the dotted line rendition of pendulum 10 and pivot plate 36 in FIG. 3.

Tube 41 comprises a protective container within which the pendulum, magnet, Hall device and circuitry components of lock control means B are encapsulated, i.e., sealed against the atmosphere. Chamber 40 is formed at the upper end of cylindrical tube 41 by a wall 42 extending across substantially the entire cross section of tube 41 except for circular central opening 44 formed in wall 42. Tube 41 may obviously be made of metal or any other suitable material, although a plastic (organic polymeric) material is preferred. For example, a thermoplastic material such as a polyethylene may be used. Collar 38 is disposed within opening 44 and rod 14' extends therethrough. The rim of opening 44 formed in wall 42 is slightly curved down, as shown, but the remainder of wall 42 is flat. The upper portion of chamber 40 is closed by upper seal cap 45 which has a soft damping material 45a disposed on the bottom thereof. Any suitable low resiliency, soft material may be employed as the damping material 45a. Seal cap 45 is affixed to tube 41 by any suitable means such as being threaded therein, or being glued or heat welded or otherwise fastened to close off the top end of tube 41.

A central chamber 40A is formed within tube 41 between wall 42 and support 26. Support 26 comprises a generally disc-shaped wall, like wall 42, but entirely closes off the inside cross section of tube 41. Support 26 thus may be a disc-shaped member supported on a rim 26a formed in the inside wall of tube 41. Support 26 may be glued, heat welded or otherwise suitably fastened to rim 26a.

A lower chamber 40B is formed between support 26 and lower seal cap 49 which, similarly to upper seal cap 45, may be glued, threaded, heat welded or otherwise fastened to close off the bottom of tube 41. Contained within lower chamber 40B are electrical components comprising the circuitry for lock control means B. Specific examples of such circuitry are set forth in FIGS. 7 and 8 and the components thereof are merely indicated schematically in FIG. 3. Leads 30, 32 connect Hall device 24 to the circuitry of lock control means B. Connectors 46 lead from lock control means B through openings in the lower portion of tube 41 to connector I which, as seen in FIG. 1, leads to the belt retractor assembly.

In operation, when acceleration forces above a preselected critical value are sensed by the device, the inertia of pendulum 10 causes it to be displaced, as indicated in dotted lines in FIG. 3, relative to its normal position. Magnet 22 and its associated magnetic field g are thereby removed further from Hall device 24 thereby causing a reduction in the magnetic field imposed on Hall device 24 and a resultant change in the output signal thereof. The changed signal operates retractor lock 2 to lock belt 6 in place (FIG. 1) via lock control means B.

The critical value at which pendulum 10 will be displaced is pre-selected (preferably from above 0.3 to 0.7g or greater) by selection of the mass of pendulum weight 12 and the length L between the centroid c of pivot plate 36 and the center of gravity cg of pendulum weight 12 to set the summation of moments about point P at the desired value.

The lower surface of pivot plate 36 and the "floor" provided by the top surface of wall 42 (except for the rim about opening 44) are each flat and the fit of pivot plate 36 within chamber 40 is quite close. The resultant flat, abutting surfaces and the close fit help to insure that pendulum 10 is not displaced from its rest position by normal acceleration forces occasioned by road vibration, normal operation, parking on a grade, etc., to give a false signal. The embodiment of FIG. 3 has been employed in actual road tests including mileage driven over rough roads, and gives satisfactory performance.

Damping material 45a helps pendulum 10 to rapidly return to its rest position after displacement. Tube 41 obviously may be mounted to a vehicle or other equipment by any suitable means.

Figures 4, 4B:
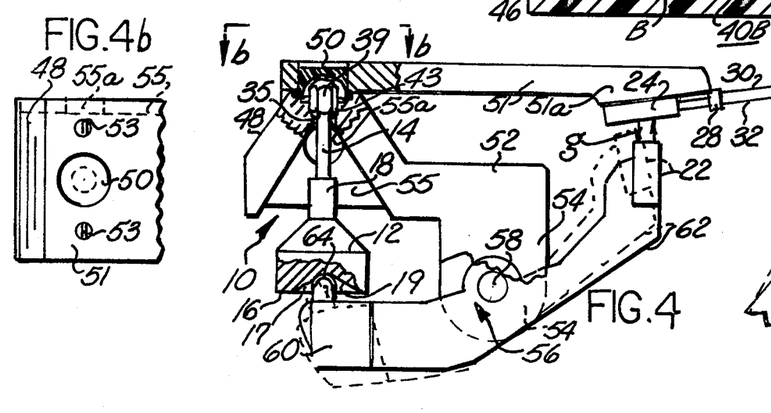
FIG. 4 is a view of the signal control portion of the invention showing yet another magnetic field embodiment.
FIG. 4b is a partial plan view taken along line b—b of FIG. 4.

FIG. 4 shows another embodiment of the invention which utilizes a pendulum in combination with a lever to change the distance between a magnet and its associated Hall device. Parts corresponding to those in the FIG. 2 embodiment are correspondingly numbered. Pendulum weight 12 is secured by means of a mounting collar 18 to a connecting rod 14'. The upper part of rod 14' is a generally spherical element 35 having flat faces 39 formed thereon. Pendulum 10 is mounted within a generally A-shaped housing 48 and retained by a socket 50. Housing 48 has conical shaped bearing surface 43 formed therein. Movement of element 35 within bearing surface 43, which is necessary for displacement from rest of pendulum 10, is thus damped. Like the pendulum device generally, the construction of element 35 and surface 43 in particular is typical of known devices provided by REPA GmbH, a German (Federal Republic of Germany) Company, and is not therefore described in detail herein.

Housing 48 includes a support bracket 52 which has bosses 54 extending downwardly therefrom. A lever arm 56 is rotatably mounted about bosses 54 on a lever shaft 58 which is journaled within holes formed in bosses 54. Lever arm 56 has a pendulum end 60 associated with pendulum weight 12 and a signal end 62 associated with Hall device 24 which, as in the embodiment of FIGS. 2 and 3, has electrical leads 30,32 connected thereto. Hall device 24 is mounted on the distal end 51a of a cantilevered support plate 51, the other end of which is affixed to the top of housing 48 by connector means such as screws 53 (FIG. 4b). The signal end 62 of lever arm 56 has a magnet 22 affixed thereto, in proximity to Hall device 24 when pendulum 10 is in its rest position. Pendulum end 60 has a stud 64 formed thereon. Stud 64 has a rounded, generally hemispherical top portion.

Pendulum weight 12 in this embodiment has a base portion 17 which has a concave, generally conically shaped chamber 19 formed therein. Chamber 19 is rounded somewhat at its apex to congruently receive the rounded top of stud 64. The engagement of stud 64 with chamber 19 further damps the pendulum against movement. Changes in the contour of chamber 19 can be used to help set the predetermined minimum acceleration force level.

Lever arm 56 is pivotably mounted on boss 54 by means of lever shaft 58. In addition to or in lieu of the damping means provided by the frictional damping surface 43 and the stud 64-conical chamber surface 19 engagement, other known pivot-damping means (not shown in FIG. 4) such as loaded springs, weights, contacting abrasive surfaces or the like, may be employed on lever arm 56 so as to set a predetermined amount of frictional resistance to rotation of lever arm 56 relative to bosses 54. Such damping means are well known in the art and are not described in detail or shown with particularity in the drawings. The pre-set frictional resistance to rotation of lever arm 56 relative to bosses 54, abetted by the weight of pendulum 10 and its resistance of inertia to pendulum action, may all be utilized to provide a pre-selected minimum acceleration level to cause pendulum 10 to be displaced from its rest position.

When the critical acceleration value is exceeded, as would occur due to emergency stops and starts, overturning or a collision, pendulum 10 swings as indicated by the dotted line rendition thereof in FIG. 4 and stud 64 is depressed downwardly by the surface of chamber 19 in contact therewith which, as pendulum weight 12 is displaced, drives stud 64 and pendulum end 60 of lever arm 56 downwardly as viewed in FIG. 4, as indicated by the dotted line rendition of lever arm 56. This raises signal end 62 of lever arm 56 and brings magnet 22 into closer proximity with Hall device 24, thereby changing the output through 30, 32 and activating the circuitry to engage lock 2 with belt pulley 4.

It will be noted that the FIG. 4 embodiment is one in which the desired change in the signal is caused by bringing magnet 22 into closer proximity to Hall device 24, rather than removing it therefrom as in the FIGS. 2 and 3 embodiments.

As best seen in FIGS. 4 and 4b, housing 48 has a plate 55 extending across the rear portion thereof. Plate 55 has a hole 55a therein, which may conveniently be used to mount the pendulum device. Additional holes (not shown) for example in the boss 54, or other means such as projecting pins, etc. may be employed to suitably mount the device to the vehicle or equipment on which it is to be employed.

Figure 4A:
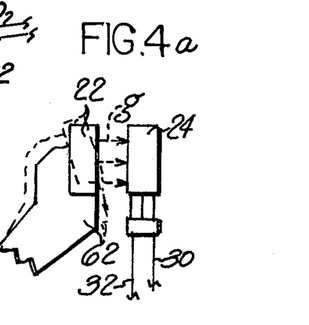
FIG. 4a is a partial view of a modified version of the embodiment of FIG. 4.

FIG. 4a shows a modification of the embodiment of FIG. 4 wherein the circuitry is arranged so that increasing the distance between magnet 22 and Hall device 24 will cause the desired change in the signal. This is attained by simply positioning Hall device 24 relative to magnet 22 as shown in FIG. 4a, the other portions of the device remaining substantially the same as that shown in FIG. 4. As indicated by the dotted outline in FIG. 4, displacement of pendulum 10 from its normal position raises the signal end 62 of lever arm 56 and, in the FIG. 4a embodiment, this movement as indicated by the dotted outline causes magnet 22 to be moved a distance further away from Hall device 24 than it is when pendulum 10 is at rest.

Figures 5, 6:
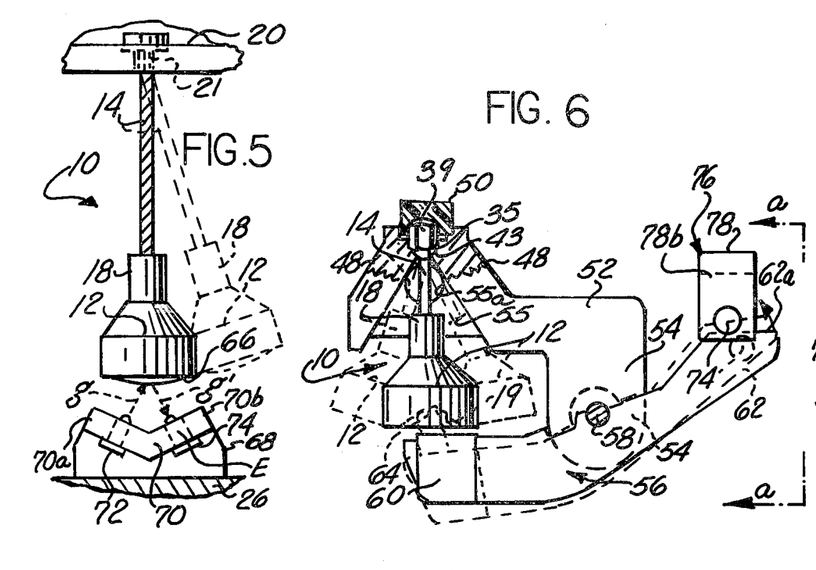
FIG. 5 is an elevation view of the signal control portion of the invention showing a light source embodiment of the invention.
FIG. 6 is an elevation view of the signal control portion of the invention showing yet another light source embodiment of the invention.
Figure 6A:
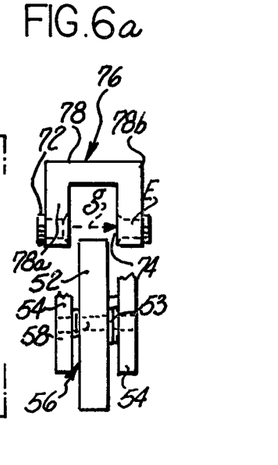
FIG. 6a is a partial view taken along line a—a of FIG. 6.

Referring now to FIG. 5, there is shown another embodiment of the invention wherein a reflector is positioned to reflect light from a light source to a light receptor when the pendulum of the device is in a rest position, and to interrupt or diminish the reflected light when the pendulum is displaced. In this embodiment, energy field g is a beam of light, energy field source D is a reflective surface mounted on the pendulum for reflecting light from a light emitting diode, and signal means E includes a phototransistor. Parts identical to those of the FIG. 2 embodiment are identically numbered. A pendulum 10 includes a wire 14 mounted to a pendulum support 20 which is similar to that shown in the embodiment of FIG. 2. Pendulum weight 12 is affixed to wire 14 by mounting collar 18. In this embodiment, the base portion 66 of pendulum weight 12 comprises a convex reflective surface. A support 26 has a platform 68 mounted thereon directly beneath the rest position of pendulum 10. The top of support 26 comprises a shallow V-shaped deck 70 having legs 70a, 70b.

In leg 70a a light emitting diode 72 is mounted so as to project a beam of light g therefrom substantially perpendicularly to leg 70a. In leg 70b is mounted a phototransistor 74, the light receiving portion of which is mounted in the surface of leg 70b so that when pendulum 10 is in its rest position, reflected light beam g, reflected from reflective surface 66, is directed perpendicularly onto the receptor surface of phototransistor 74. As with other embodiments of the invention, the inertial resistance of pendulum 10 to oscillation is determined by the mass of pendulum 10, primarily weight 12, and the tension of calibrated wire 14. When acceleration at or above a pre-selected critical value is attained, pendulum 10 is displaced out of its normal position, thus interrupting or reducing the intensity of light reflected from light emitting diode 72 onto the receptor surface of phototransistor 74. The change in light intensity beamed onto the receptor surface of phototransistor 74 changes an output signal of signal means E to activate a retractor lock as described in more detail hereinbelow.

FIG. 6 shows an embodiment of the invention wherein displacement of the pendulum interposes a shield between a light source comprising an energy field source D and a phototransistor forming a part of a signal means E. The FIG. 6 embodiment includes a pendulum and lever combination which, except for the signal end 62 of lever arm 56 and its associated signal device E, is substantially similar to the embodiment shown in FIG. 4. Parts identical to those of the FIG. 4 embodiment are identically numbered. A pendulum 10 is suspended within a retaining means 48 and has a base portion within which a concave chamber 19 is formed to engagingly receive a rounded top end 65 of a stud 64. Lever arm 56 is mounted on bosses 54. Signal end 62 of lever arm 56 has a topmost edge 62a. Frictional engagement means are schematically shown at 53 associated, respectively, with lever arm 56 and boss 54 to help to damp rotation of lever arm 56 about boss 54. Frictional surfaces according to the REPA GmbH design described above are preferred, to help establish the predetermined resistance to pendulum displacement.

Adjacent signal end 62 of lever arm 56 an inverted U-shaped bracket 76 is suitably mounted by means (not shown) to the vehicle or other equipment within which the device of the invention is utilized. Bracket 76 has a central portion 78 and two depending legs 78a and 78b extending downwardly therefrom. Within leg 78a a light emitting diode 72 is mounted so as to direct a beam of light g onto the receptor surface of a phototransistor 74 which is mounted opposite to it in depending leg 78b. Light emitting diode 72 is thus mounted on the opposite side of the plane of travel of signal end 62 from phototransistor 74; diode 72 and phototransistor 74 are each adjacent signal end 62 and each other. With pendulum 10 in its normal position, the topmost edge 62a of signal end 62 is positioned below the beam of light g. Upon deceleration forces at or above the predetermined critical value being attained, the inertial resistance of pendulum 10 is overcome and pendulum 10 is displaced in any direction from its normal position, thereby depressing pendulum end 60 of lever arm 56 and raising signal end 62 so that the upper portion thereof intercepts a part or all of the light beam g, and prevents transmission of it to phototransistor 74. This results in a change in the signal emitted from signal means E to lock control means B (FIG. 1) resulting in actuation of retractor lock 2.

It will be apparent that the magnet and Hall device embodiment could be similarly employed in a mounting bracket arrangement such as shown in FIG. 6, with the signal end 62 of lever arm 56 serving as a shield to interrupt or diminish the magnetic field transmitted from a magnet (which would be positioned at the location of light emitting diode 72) to a Hall device positioned at the location of phototransistor 74.

Generally, the light emitter-phototransistor and magnet-Hall device embodiments may be interchanged among any of the devices shown. While the devices obviously can be made to any desired size, they can conveniently be quite small. Sample pendulum devices have been made and tested which are about 1¾ inches tall, so that the tube 41 of FIG. 4, for example, would measure about 2 or 2½ inches in height.

Figure 7:
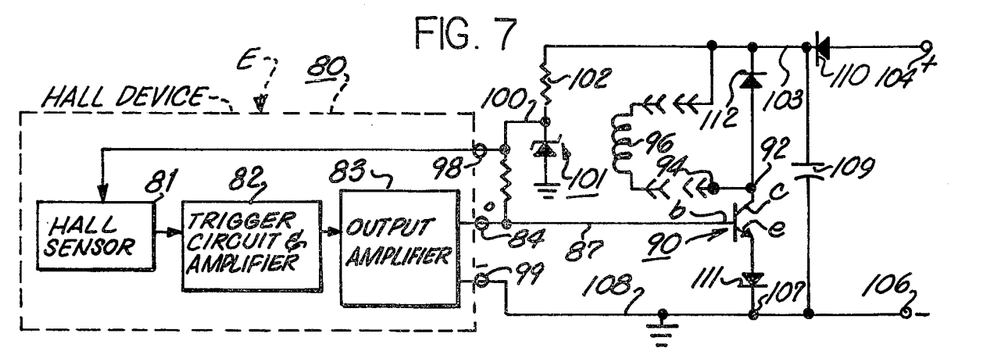
FIG. 7 is a circuit diagram showing one embodiment of the circuitry usable with a magnetic embodiment of the invention.

Referring now to FIG. 7, there is shown mechanically static circuitry utilizable in the embodiment of the invention wherein a Hall device or equivalent means is included in the electrical signal means E, and a permanent magnet serves as energy field source D (not shown in FIG. 7). A Hall device is generally indicated at 80. A known, commercially available embodiment of Hall device 80 includes a Hall sensor 81, a trigger circuit and amplifier 82 and an output amplifier 83. Output amplifier 83 is connected from terminal 84 through line 87 to base terminal b of NPN transistor 90, which may be considered a "switching transistor." Transistor 90 has a collector terminal c connected at point 92 to line 94, thence to solenoid coil 96 which operates retractor locks 2 (not shown in FIG. 7). Hall device 80 has a positive terminal 98 connected via line 100, a Zener device 101, a resistor 102 and line 103 to the positive terminal 104 of a power source which, in an automobile, may be the positive pole of the standard 12-volt battery. The negative terminal of the power source is indicated at 106. A capacitor 109 is connected in series with a diode 110 across terminals 104 and 106. Emitter terminal e of transistor 90 is connected to the anode of diode 111. The cathode of diode 111 is connected at point 107 to line 108 which connects the negative terminal 99 of Hall device 80 to the negative terminal 106 of the power source. Capacitor 109 and diode 110 filter noise from the vehicle 12-volt circuitry. Diode 111 is connected between emitter terminal e of transistor 90 and point 107, to serve as a temperature compensator. Diode 112 is connected on collector terminal c of transistor 90 to protect it and insure positive turn on. The Zener portion of the circuit regulates power to the Hall device which, as stated above, is a known commercially available proprietary device.

In operation, in the normal unactuated condition corresponding to pendulum 10 being in its normal or rest position, transistor 90 is turned off and the potential at terminal 84 through line 87 is zero or too low to turn transistor 90 on. With transistor 90 off, the circuit from terminal 104 through solenoid coil 96 and transistor 90 to negative terminal 106 is interrupted. Upon displacement of pendulum 10 from its normal rest position and the resultant disturbance of the energy field imposed upon Hall device 80, the potential at terminal 84 is increased so that line 87 conducts the output signal current and turns on transistor 90. With transistor 90 on, the circuit from positive terminal 104 to negative terminal 106 through coil 96 is completed and current flows through solenoid coil 96 which operates to actuate retractor locks 2 (FIG. 1) in the known manner. Upon return of pendulum 10 its normal or rest position, the signal means is reversed, the potential at terminal 84 drops to its low or zero value and solenoid coil 96 is de-energized. A spring loading the plunger of solenoid coil 96 (not shown in FIG. 7) returns the plunger to its original position and the retractor locks 2 are released.

Figure 8:
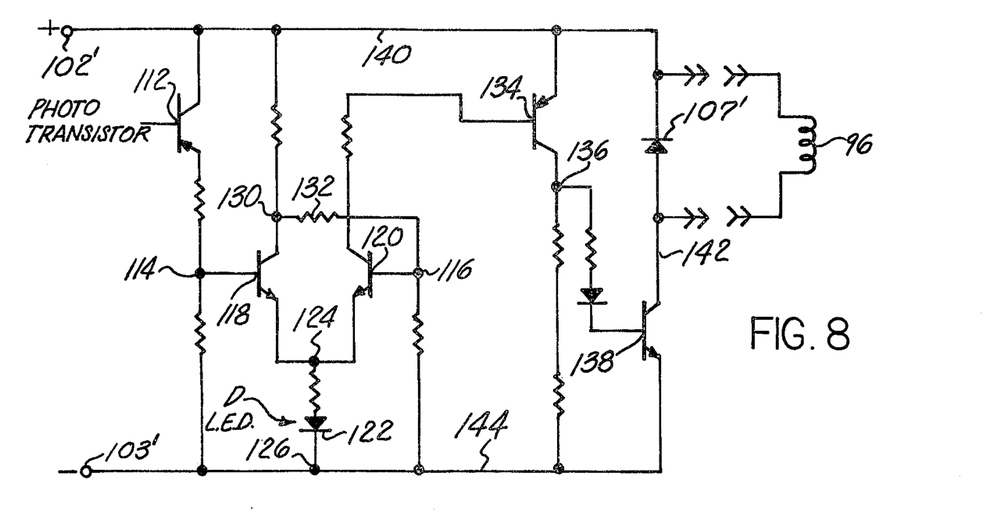
FIG. 8 is a circuit diagram showing one embodiment of the circuitry usable with a light emitting embodiment of the invention.

Referring now to FIG. 8, there is shown another, standard embodiment of mechanically static circuitry utilizable in the embodiment of the invention wherein a phototransistor is included in the electrical signal means E and a light source serves as the energy field source D. A phototransistor 112 is connected between the positive terminal 102' and the negative terminal 103' of a power source, such as an automobile or other vehicle battery, e.g., the standard 12-volt automobile battery. A differential amplifier is connected between junctions 114 and 116 and includes transistors 118 and 120. Energy field source D in this case comprises a light emitting diode 122 which is connected in series with the differential amplifier at junctions 124 and 126. A resistance 132 is connected between the collector terminal of transistor 118 and the base terminal of transistor 120 at junctions 130, 116. A transistor 134 has its base terminal connected to the collector terminal of transistor 120, and its collector terminal connected by junction 136 to the base terminal of a transistor 138. Transistor 138 may be considered a "switching" device and is connected in series via lines 140, 142 and 144 with the seat belt retractor lock solenoid coil 96, and solenoid coil discharge rectifier 107'.

In operation, when the pendulum device is in its normal or rest position, transistor 138 is off so that no current will flow through solenoid coil 96 from terminal 102 to terminal 103. In order to maintain transistor 138 off, transistor 134 must be off, and for transistor 134 to be off, transistor 120 must be off. In order for transistor 120 to be off, transistor 118 must be conducting, and in order for transistor 118 to be conducting phototransistor 112 must also be conducting. It follows that the potential at junction 124 must be higher than the potential at junction 116. Accordingly, the voltage drop across 132 is greater than the voltage drop across transistor 118.

When the device is actuated by a change, i.e., in the illustrated embodiment, a reduction, in the light impinging on phototransistor 112, the conductivity through phototransistor 112 is changed, i.e., reduced. The potential 114 is accordingly reduced because of the higher voltage voltage drop from terminal 102 to junction 114, and transistor 118 turns off. Accordingly, the potential at junction 130 increases as does the potential at junction 116. The increase in potential at junction 116 turns on transistor 120, thereby closing the circuit to the base terminal of transistor 134. Transistor 134 is thus turned on and with 134 turned on the voltage at junction 136 increases and turns on "switching" transistor 138. This closes the circuit from positive terminal 102' to negative terminal 103' through solenoid coil 96, thereby actuating retractor lock 2.

As illustrated by the embodiments shown in FIGS. 7 and 8, displacement of the pendulum means is detected electronically by utilizing the change in output signals which are electrically interfaced with solenoid or other locking mechanisms on the several retractors. Preferably, the electric circuits shown are energized from the ignition key switch. The Hall device-magnet couple and the phototransistor-light emitting diode couple comprise solid state devices which act as electric switches when there is a change such as interruption or diminution of the magnetic field or light beam acting, respectively, between the respective couple components. Such change causes or initiation of an output signal from the solid state couples and these output signals are amplified to switch the power supply to the retractor locking coils. The embodiment of FIG. 7 shows fewer components because the commercially available solid state Hall device included in the signal means E contains the initial signal conditioning stages which are not shown in detail therein.

Generally, the circuitry of FIG. 8 shows electrically operated seat-belt retractor locking means connected in series with the emitter and control terminals of a switching transistor, to a power supply. A supply of power is connected to the switching transistor base terminal. The current flow to said base terminal is controlled by a phototransistor, the conductivity of which is dependent upon the intensity of light imposed thereon. Means responsive to displacement from rest of the pendulum device changes the amount of light imposed on the transistor, which change supplies power to the switching transistor base terminal to close the circuit from the power source through the electrical means and thereby operate the retractor lock.

FIG. 7 shows a similar type of circuitry, except that the power supply to the base terminal of the switching transistor is actuated by means which include a Hall device responsive to a change in the strength of the magnetic field imposed thereon, the position of the magnetic field and its intensity relative to the device being responsive to displacement of the pendulum means from its rest position.

While the invention has been described in detail with respect to specific embodiments thereof, it will be apparent to those skilled in the art upon a reading and understanding of the foregoing description that numerous changes and alterations to such specific embodiments may be made, which changes and alternations are nonetheless within the spirit and scope of the invention. It is intended to include all such changes and alterations within the scope of the appended claims.

What is claimed is:

1. An emergency locking belt retractor device for a vehicle, said device comprising a belt retractor and a retractor lock associated therewith, lock control means actuable to cause the retractor to lock the belt retractor, an electrical circuit including (1) signal means incorporating a Hall device and including means for generating an output signal which changes in magnitude in response to changes in a magnetic field imposed on the Hall device, (2) circuit means for actuating the lock control means to engage the lock with a retractor to lock the retractor, and (3) circuit closing means for causing said output signal of said signal means to close said circuit means to lock said retractor at a predetermined magnitude of said output signal, an inertia member mounted for displacement from a rest position in response to gravitational inertial forces due to predetermined modes of movement of the vehicle including a pendulum weight, a magnet connected with said inertia member and mounted on the bottom of said pendulum weight, and being disposed in a predetermined position with respect to said signal means for imposing its field on said Hall device when said inertia member is in said rest position, means including said inertia member for displacing the magnet relative to said Hall device in response to displacement of said inertia member from said rest position for varying the strength of the magnetic field imposed on the signal means in response to movement of said inertia member from the rest position for varying the magnitude of said output signal.

2. The device of claim 1 wherein said signal means is mounted at a location which is adjacent to said magnet when said pendulum is in its rest position.

3. An emergency locking belt retractor device for a vehicle, said device comprising a belt retractor and a lock associated therewith, said lock including electrically operated lock control means and electrical signal means incorporating a Hall device to generate an output signal the strength of which is responsive to the strength of an energy field imposed on said signal means, said device further including an electrical circuit including a power supply and circuit closing means responsive to a predetermined magnitude of said output signal to close the circuit and actuate said lock control means, said electrically operated lock control means being connected to said power supply by said electrical circuit and said electrically operated lock control means also including a switching transistor connected in series with said power supply and said lock control means by its emitter and control terminals, a supply of power connected to the base terminal of said switching transistor and controlled by current flow through said Hall device, the conductivity of which is dependent upon the intensity of a magnetic field imposed thereon, an energy field source including a magnet for imposing said magnetic field on said signal means, energy field control means adapted to change the intensity of said magnetic field imposed on said Hall device in response to acceleration so as to increase the flow of current to said base terminal to close the circuit and thereby actuate said electrically operated lock control means, and including an inertia member, means for supporting said inertia member in a rest position under the influence of gravity and for permitting displacement of said inertia member from said rest position in response to a horizontal component of gravitational or inertial forces due to predetermined modes of movement of the vehicle in any direction, said energy field control means including said magnet connected with said inertia member and being movable in a predetermined manner in response to movement of said inertia member, said energy field control means including means for maintaining the strength of the energy field imposed on said signal means by said energy field source substantially constant and at a maximum value when said inertia member is in said rest position, said energy field control means further including means for decreasing the strength of the energy field imposed on said signal means in response to displacement of said inertia member from said rest position, electrically operated lock control means being responsive to a predetermined degree of change of the strength of the output signal to actuate said lock to effect locking of the belt retractor, said energy field source and said signal means being physically unconnected to each other, and the magnetic field existing between said energy field source and said signal means being insufficient to resist displacement of said inertia member from said rest position in response to change in the speed of said vehicle in any horizontal direction.

4. An emergency locking belt retractor device for a vehicle, said device comprising a belt retractor and a retractor lock associated therewith, lock control means actuable to cause the retractor lock to lock the belt retractor, an electrical circuit including (1) signal means incorporating a Hall device and including means for generating an output signal which changes in magnitude in response to changes in a magnetic field imposed on the Hall device, (2) circuit means for actuating the lock control means to engage the lock with the retractor to lock the retractor, and (3) circuit closing means for causing said output signal of said signal means to close said circuit means to lock said retractor at a predetermined magnitude of said output signal, inertia responsive means comprising a pendulum having a pendulum weight mounted for displacement from a rest position in response to gravitational inertial forces due to predetermined modes of movement of the vehicle, a magnet fixedly connected with said pendulum weight and being disposed in a predetermined position with respect to said signal means for imposing its field on said Hall device when said pendulum weight is in said rest position, means including said pendulum weight for displacing the magnet relative to said Hall device in response to displacement of said pendulum weight from said rest position for varying the strength of the magnetic field imposed on the signal means in response to movement of said pendulum weight from the rest position for varying the magnitude of said output signal.

5. The device of claim 4 wherein the circuit closing means includes amplifier means to amplify the output signal.

6. The device of claim 4 wherein pendulum weight is mounted on a rigid rod affixed to a pivot plate pivotably mounted within a pivot chamber.

7. The device of claim 4 wherein said energy field control means, said energy field source and said signal means are encapsulated in a protective container.

8. An emergency locking belt retractor device for a vehicle, said device comprising a belt retractor and a lock associated therewith, said lock including mechanically static signal means to generate an output signal the strength of which is responsive to the strength of an energy field imposed on said signal means, an energy field source for imposing an energy field on said mechanically static signal means, energy field control means for changing the strength of the energy field imposed on said signal means in response to predetermined modes of movement of the vehicle, said energy field control means comprising a pendulum including a pendulum weight, a rigid rod having a first portion fixed to said pendulum weight, a pivot plate having a peripheral rim portion, said rigid rod having a second portion connected with said pivot plate, pendulum support means comprising means defining a support surface disposed to engage a selected portion of said pivot plate to freely support said pendulum weight under the influence of gravity in a rest position with said rigid rod extending in first direction, said pendulum support means further defining housing means for allowing said pivot plate to pivot about relative to said support surface to allow displacement of said pendulum weight from said rest position in response to inertial or gravitational forces on said pendulum weight above a predetermined amount and means for preventing more than a predetermined degree of movement of said pivot plate in directions transverse to said first direction, said energy source being carried by said pendulum for changing the strength of the energy field imposed on said mechanically static signal means to vary the strength of said output signal in response to displacement of said pendulum from said rest position, and lock control means operative in response to a predetermined amount of change in the strength of said output signal to actuate said lock to effect locking of the belt retractor.

9. Apparatus as defined in claim 8 wherein said signal means comprises a Hall device, and wherein said means carried by said pendulum comprises a magnet fixedly connected with the bottom of the said pendulum weight.

10. In a vehicle having an occupant restraint system having means for restraining forward movement of an occupant in response to an emergency condition including a retractor connected with the restraint system, an emergency locking system including means for actuating the retractor to place the restraint system in a condition in which it restrains forward movement of the occupant, lock control means actuable to lock the retractor, an electrical circuit including mechanically static signal means including means for generating an electric output signal which changes in magnitude in response to changes in the magnitude of an energy field imposed on said mechanically static signal means, an energy field source for imposing an energy field on said mechanically static signal means, circuit means for causing said output signal of said signal means to actuate said lock control means to actuate said retractor at a predetermined magnitude of said output signal, and means for changing the magnitude of the energy field on said mechanically static signal means comprising a pendulum having a pendulum weight mounted for multidirectional displacement from a rest position in response to gravitational-inertial forces due to predetermined modes of the vehicle during an emergency condition, said energy field source being fixedly connected with said pendulum weight and being movable therewith in response to gravitational-inertial forces to change the strength of the energy field on said mechanically static signal means.

11. The device of claim 10 wherein said signal means comprises electrical signal means, said lock control means comprises an electrically operated lock control means, said circuit means including an electrical circuit including a power supply and a circuit closing means responsive to the predetermined magnitude of said output signal to close said circuit to actuate said lock control means.

12. The device of claim 11 further including amplifier means to amplify said output signal and wherein said circuit closing means comprises switch means responsive to the amplified output signal to close said circuit.

13. The device of claim 10 wherein said energy field source is a magnet, said energy field is a magnetic field, and said electrical signal means includes a Hall device.

14. The device of claim 10 wherein said pendulum weight is suspended on a calibrated wire.

15. The device of claim 10 wherein said said pendulum weight is mounted on a rigid rod affixed to a pivot plate pivotably mounted within a pivot chamber.

16. The device of claim 10 wherein said energy field control means, said energy field source and said signal means are encapsulated in a protective container.

17. Apparatus as defined in claim 10 wherein said pendulum includes means for damping movement of said pendulum from said rest position.

18. The device of claim 10 wherein said signal means includes a phototransistor, and wherein said energy field source comprises means fixedly connected with said pendulum weight for directing light energy relative to said phototransistor.

19. The device of claim 10 wherein said lock control means are connected to a power supply by said circuit means, said circuit means including a switching transistor connected in series with said power supply and said lock control means by its emittor and control terminals, a supply of power connected to the base terminal of said switching transistor and controlled by current flow through said phototransistor, the conductivity of which is dependent upon the intensity of light imposed thereon, said pendulum weight being effective to move the field source relative to the phototransistor to change the intensity of light imposed on said phototransistor in response to gravitational-inertial forces so as to increase the flow of current to said base terminal to close the circuit and thereby actuate said lock control means.

20. The device of claim 19 wherein said energy field source comprises a reflective surface mounted on said pendulum weight which, when said pendulum weight is in its rest position reflects a predetermined amount of light onto said phototransitor, said pendulum being effective to displace said reflective surface from its rest position in response to said predetermined modes of movement of the vehicle to diminish the intensity of light reflected onto said phototransistor.

21. The device of claim 20 wherein said reflective surface comprises a convex reflective surface.

22. An emergency locking belt retractor device for a vehicle, said device comprising a belt retractor and a lock associated therewith, said lock including mechanically static signal means to generate an output signal the strength of which is responsive to the strength of an energy field imposed on said signal means, an energy field source for imposing an energy field on said mechanically static signal means, energy field control means for changing the strength of the energy field imposed on said signal means in response to predetermined modes of movement of the vehicle, said energy field control means comprising a pendulum including a pendulum weight, a rigid rod having a first portion fixed to said pendulum weight, a pivot plate extending transverse to said rigid rod, said rigid rod having a portion fixedly connected with said pivot plate, pendulum support means comprising means defining a support surface disposed to engage selected portions of said pivot plate spaced from the point of attachment of said pivot plate with said rigid rod to freely support said pendulum weight under the influence of gravity in a rest position with said rigid rod extending in first direction and allowing said pivot plate to pivot about said selected portions to allow multi-directional displacement of said pendulum weight from said rest position in response to inertial or gravitational forces on said pendulum weight above a predetermined amount, said energy field source being carried by said pendulum for changing the strength of the energy field imposed on said mechanically static signal means to vary the strength of said output signal in response to multi-directional displacement of said pendulum from said rest position, and lock control means operative in response to a predetermined amount of change in the strength of said output signal to actuate said lock to effect locking of the belt retractor.

23. Apparatus as defined in claim 22 wherein said signal means comprises a Hall device, and wherein said energy field source comprises a magnet fixedly connected with the bottom of the said pendulum weight.

24. Apparatus as defined in claim 22 including housing means for preventing more than a predetermined degree of movement of said pivot plate in directions transverse to said first direction.

* * * * *

UNITED STATES PATENT AND TRADEMARK OFFICE
CERTIFICATE OF CORRECTION

PATENT NO. : 4,103,842
DATED : August 1, 1978
INVENTOR(S) : Thomas F. Martin et al.

It is certified that error appears in the above-identified patent and that said Letters Patent are hereby corrected as shown below:

Column 16, line 37 delete the second appearance of "said".

Signed and Sealed this

Third Day of April 1979

[SEAL]

Attest:

RUTH C. MASON
Attesting Officer

DONALD W. BANNER
Commissioner of Patents and Trademarks